United States Patent [19]

Eisele et al.

[11] 4,379,804

[45] * Apr. 12, 1983

[54] LIQUID SORBENT MATERIALS

[75] Inventors: John F. Eisele, Lake Elmo; Elizabeth A. Mercer, Woodbury, both of Minn.

[73] Assignee: Minnesota Mining and Manufacturing Company, St. Paul, Minn.

[*] Notice: The portion of the term of this patent subsequent to Sep. 30, 1997, has been disclaimed.

[21] Appl. No.: 188,048

[22] Filed: Sep. 17, 1980

Related U.S. Application Data

[63] Continuation-in-part of Ser. No. 28,347, Apr. 9, 1979, Pat. No. 4,225,652.

[51] Int. Cl.³ .................... B32B 23/08; B32B 27/08; B32B 27/10; B32B 27/36
[52] U.S. Cl. .................... 428/332; 428/334; 428/480; 428/483; 428/511; 428/514; 428/515; 428/520; 428/913
[58] Field of Search ............... 428/519, 203, 332, 334, 428/480, 483, 411, 514, 515, 520, 913; 525/333

[56] References Cited

U.S. PATENT DOCUMENTS 3,661,874  5/1972  Olson .................................. 525/333
4,225,652  9/1980  Mercer et al. ...................... 428/515

Primary Examiner—Thomas J. Herbert, Jr.
Attorney, Agent, or Firm—Cruzan Alexander; Donald M. Sell; Warren R. Bovee

[57] ABSTRACT

Composite, liquid-sorbent media which can be applied to various substrates to provide improved liquid-sorbent materials. The composite media comprise a liquid-sorbent underlayer and, overlying said underlayer, a liquid-permeable surface layer, the liquid sorptivity of said underlayer being greater than the liquid sorptivity of said surface layer. Transparent sheets having the liquid-sorbent composite media coated on the surface are described as a preferred embodiment of the invention.

16 Claims, 1 Drawing Figure

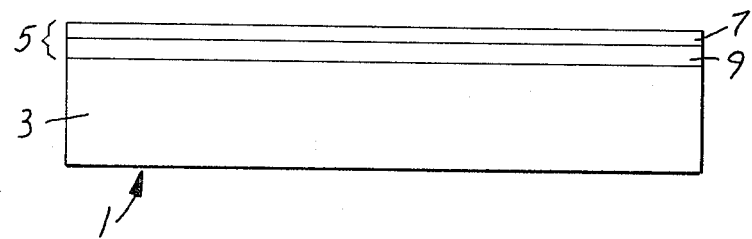

LIQUID SORBENT MATERIALS

RELATED APPLICATIONS

This application is a continuation-in-part of applicants' copending application Ser. No. 28,347 filed Apr. 9, 1979, now U.S. Pat. No. 4,225,652.

FIELD OF THE INVENTION

This invention relates to liquid-receptive media. This invention further relates to composite, media which can be applied to various substrates to provide improved liquid-sorbent characteristics. In a preferred embodiment this invention relates to ink-receptive surface media for polymeric films which have desirable surface characteristics combined with rapid ink drying characteristics rendering such films particularly useful in computer-driven, graphic plotting devices.

DESCRIPTION OF THE PRIOR ART

Polymeric sheet materials, particularly transparent sheet materials, are commonly used to prepare imaged sheets for projection onto a surface for viewing. One technique for preparing such "visual transparencies" involves depositing ink on the surface of the sheet to provide the desired images. Recently, computer-driven graphic plotting devices have become available which can quickly and precisely generate complex, graphic information. These plotters conventionally utilize pens containing solvent-based inks which can remain exposed to the air for long periods of time without drying out by employing solvents of low volatility to retard drying of the pen tips.

While the graphic plotting devices can generate particularly attractive and effective materials for visual presentation, the nature of the inks required to maintain reasonably long pen life, e.g. low volatility, poses problems in the preparation and handling of the graphic materials. For example, many substrates do not readily accept these inks and the ink beads up on the surface of the film. Other substrates that accept the inks to a greater degree still require an extended period of time, e.g. 3 minutes or more, before the surface is dry enough for handling. This greatly increases the opportunity for the image to be smeared during removal of the substrate from the plotter or during handling and stacking of the imaged sheets. Other inking problems are evidenced by irregular image density, including dots at the end of a pen stroke, and severe striations resulting from the multiple, adjacent pen strokes required to "paint" a large block of color, such as when generating a bar chart or other images comprising blocks of color.

SUMMARY

The present invention provides a medium which is permeable to liquids deposited on the surface and which causes the liquids to be imbibed into the medium in a preselected manner. Such a medium finds utility in a variety of applications such as where the controlled "drying" of inks or other imaging materials is desired. In addition, the use of such media may be advantageous in a number of other applications where a liquid must be deposited on a substrate, followed by further processing, handling, stacking, packaging, etc. of the coated substrate without smearing of the deposited material.

The present invention relates to a method of providing composite, liquid-sorbent media having selected, liquid sorption characteristics and to the composite media so provided. The method comprises selecting a first, liquid-permeable material having certain desired physical and chemical characteristics for a particular application, independent of the characteristic of liquid sorptivity, or dry time, and then selecting a second material having a greater liquid sorptivity (or shorter dry time) than said first material. The first and second materials are then combined to provide a composite, liquid-sorbent medium comprising a first, liquid-permeable, surface layer overlying a second, liquid-sorbent underlayer, the sorption time (or dry time) for the composite medium being less than the sorption time for an equivalent thickness of the surface material alone. Thus, the present invention relates to a means for modifying the apparent liquid-sorbent characteristics of a layer of liquid-sorbent material.

Yet another aspect of the invention relates to an imaging system comprising an imaging liquid, and a composite liquid-sorbent medium for the imaging liquid.

As used in the present application, "sorption time" or "dry time" refers to the time required for the mark placed on the surface of the medium to cease to be detrimentally affected by the influence of commonly encountered external forces. For example, the time from application until the mark, for example, ink image, is not smeared by light contact with a finger.

The practice of the present invention allows the construction of media having optimum surface properties as well as optimum dry time characteristics. Prior to the present invention the choise of substrate materials or coatings thereon generally required a compromise between surface characteristics and sorption time. By practicing the present invention the surface characteristics and sorption time can be selected independently and optimized for any particular application.

The liquid sorbent media of the present invention have been found to be particularly useful where a substrate to be coated, printed, inked, etc. does not intrinsically have the desired physical characteristics or liquid-sorbent properties. In a particularly preferred application, to be discussed in greater detail hereinafter, a transparent polymeric sheet which is intrinsically a poor ink receiver is coated with the liquid-sorbent, composite medium to provide an ink-receptive surface having ink sorption and physical characteristics particularly useful with mechanical pen plotters.

As used in the present application "liquid sorbent" or "liquid-sorptive" refers to materials which can combine with or imbibe liquid whether by the mechanism of absorption, adsorption, solvation or the like. "Liquid-permeable" refers to materials which can transport liquid through the layer whether by viscous flow, diffusion, or other mechanism. As will be understood from the description hereinafter, liquid permeable materials may also be liquid-sorbent, but when used as the surface layer in the liquid-sorbent media of the present invention, these materials function primarily as a permeable, transport layer through which liquid deposited on the surface can migrate.

BRIEF DESCRIPTION OF THE FIGURE

The FIGURE shows an elevation view of a liquid-sorbent sheet according to the present invention.

DETAILED DESCRIPTION

Referring to the drawing there is shown a liquid-sorbent sheet 1 comprising substrate 3 having a liquid-sorbent, composite medium 5 coated on one surface thereof. Composite medium 5 comprises surface layer 7 overlying underlayer 9.

The liquid-sorbent media of the present invention are composite media comprising a first, liquid-permeable, surface layer having physical characteristics suitable for the intended application and a second, underlayer in intimate contact with the surface layer having an affinity for the liquid to be applied to the surface layer wherein the sorption time of the composite media is less than the sorption time of the surface layer material alone, given equal thicknesses of the surface material. The surface layer must also have the ability to exhibit the desired surface characteristics, i.e. retain its integrity, in contact with the liquid and the liquid applying means.

The present invention allows the selection and use of materials having desirable physical characteristics for use as a surface layer, but having less than optimum drying or liquid sorption characteristics, by providing a second underlayer material which has liquid sorption characteristics such that when used in combination with a liquid-permeable surface layer will provide a composite medium having the desired sorption time. Generally, the liquid sorptivity of the underlayer will be greater than for the surface layer. The liquid sorptivity can be satisfactorily determined by a "sorption time" or "dry time" test or other analogous test as will be described in greater detail hereinafter.

Because the present invention has a potentially broad scope of application, the criteria for selecting useful materials for the surface and underlayers will, of necessity, be somewhat generalized in this specification. However, techniques for selecting such materials with regard to such general application will be taught. In addition, selection criteria, techniques and specific materials for use with mechanical plotters will be presented in greater detail in accordance with the general teachings of the invention.

While not being bound by any particular mechanism or theory, it is believed that the combination of layers of the composite media of the present invention cause liquid which is deposited on the surface layer to migrate through the permeable surface layer into the underlying, liquid-sorbent layer. Because the underlayer material is chosen to have a liquid sorptivity or affinity which is greater than for the material of the surface layer, a differential sorptivity or affinity is present which creates a driving force causing preferential diffusion or migration of the liquid through the top layer to the underlying, liquid-sorbent layer. The effect of this differential sorptivity is to promote transfer of liquid across the interface from the surface layer to the underlayer which acts as a reservoir or sink. Thus, the rate at which liquid is transported from the surface of the surface layer is increased. Moreover, because the underlayer acts as a sink continually "attracting" liquid from the surface layer, the concentration of liquid in the surface layer can be maintained below the level at which softening or gelling of the surface layer would occur (assuming saturation of the underlayer does not occur).

Because the operation of the composite media of the present invention would appear to be dependent on the mechanism of mass transport through a finite surface layer, such as by diffusion, viscous flow, etc., the time for migration from the surface to occur will be dependent on the thickness of the surface layer. Since relatively rapid dry times on the order of several minutes or less are often desired, in a preferred embodiment of the invention the surface layer is a relatively thin film. Preferably the film is no more than about 2-10 micrometers thick and most preferably about 4-6 micrometers thick. Thicker films will exhibit correspondingly longer sorption times and may therefor be unsuitable for some applications. Thinner films may dry too rapidly to be useful for some applications. The thickness of the underlayer is less critical although care should be taken to provide enough material to allow complete sorption of the liquid to be applied without saturation. Generally, the layer should be at least about 4 micrometers thick. The upper limit on thickness is generally not critical and will depend on such factors as cost, optical properties, flexibility, amount of liquid to be absorbed, etc.

In selecting materials for the composite medium, a number of characteristics dictated by the particular application desired must be considered. Therefor, it has been found advantageous to approach the selection by first screening candidate materials for suitability with regard to physical properties, and independent of sorption time, for the particular application desired. For example, screening can be accomplished by testing various surface materials for hardness, solvent resistance, flexibility, optical properties, etc., using the actual liquids and use conditions to be encountered. Alternatively subjecting materials to certain standardized tests, such as gel swell tests, may also be useful for initial screening. From this first screening test one or more satisfactory candidates, independent of sorption time, can be selected. Next, the sorption times of the surface layer materials selected and other candidate underlayer materials can be determined. "Sorption time" in this instance, refers to the time following application of liquid required to reach some selected condition, for example, resistance to smearing or blocking, becoming non-tacky, etc. The criteria for the selected condition will depend on the use to which the medium is to be applied.

Once the sorption times are known, composite media are prepared using all candidate surface layer materials in combination with all other materials, as underlayers, which have been tested for sorption time. The sorption times of these composites are then determined using the same sorption time test as before.

When the sorption times of these composites have been determined, the range of sorption times which can be achieved will be known and the appropriate combination can be selected.

While the selection technique described herein is of necessity somewhat empirical due to the broad application of this invention, the techniques are easily applied and readily lead to the advantageous practice of the invention. These techniques provide for selection of materials which provide a composite media having fully acceptable surface properties and optimum sorption times for the desired application. More particularly, media are provided which have a liquid-permeable surface layer which has the ability to maintain its integrity during use and a liquid-sorbent underlayer. The liquid sorptivity of the underlayer must be greater than the liquid sorptivity of the surface layer in order to reduce the effective sorption time of the surface layer.

The practice of the present invention can readily be illustrated by reference to a particular application environment. The selection and construction of a liquid receptive film for use with mechanical plotters will be described as illustrative of the general teachings of the present invention.

Mechanical plotters are now available which can be interfaced with computers and programmed to produce high quality, multicolor graphic plots. These plotters offer the ability to make rapid pen movements with high resolution, e.g. addressable moves as small as 0.025 mm with pen speeds up to 360 mm/second. In order to take advantage of these precisely controlled pen movements, the tips must be very fine and rather hard. These fine-tipped, high-speed pens require a smooth writing surface which must retain its integrity during application of the liquid while at the same time being receptive to and permeable to the liquids used in the pens to provide rapid sorption or drying times.

In a typical situation, plotter pens contain liquid vehicles comprising lower alcohols such as methanol and n-propanol, ketones such as acetone, methyl cellosolve, methyl and propyl formate, trichloroethylene, toluene and the like. These blends are formulated to provide long pen life as well as to dissolve the dyes used in the marking fluids. The substrate of choice for preparing projection transparencies is a transparent polyester substrate. The marking fluids do not dry quickly enough when applied directly to these substrates resulting in smearing and streaking when imaged and blocking of the sheets if stacked together before drying for a long period, e.g., in excess of 8-10 minutes.

In order to provide an acceptable liquid receptive transparency substrate a number of characteristics may be important. For example, the film should be evaluated with respect to the following characteristics:
1. Acceptable dry time
2. Haze
3. Color intensity
4. Ink fading
5. Image uniformity
6. Adhesion
7. Ink permanency
8. Fingerprinting
9. Shelf life
10. Projector stage life
11. Ink spreading
12. Curling
13. Abrasion resistance Other such criteria can be readily established for other applications.

As can be appreciated, the present invention finds application in a number of cases where a liquid is applied to a substrate, particularly where an imaging liquid is applied and is required to retain the image definition. Various liquid dispensing or applying means known in the art may be employed such as marking pens, spray devices, swabs, brushes, ribbons, printing presses, etc. These liquid applying means may act by direct contact with the surface of the composite media or by dispensing the liquid onto the surface without direct contact by the applying means. Obviously, if the applying means directly contacts the surface, particularly with some force as is the case with application from a marking pen, then the surface material must meet more stringent operating conditions than where the liquid is applied without direct contact of the applying means, such as by spraying of the liquid.

Certain of the tests to measure these qualities are well known in the relevant arts and others will be readily determined by a skilled worker in the art. In the present example, a number of polymer candidates are screened for acceptable surface characteristics, applying the criteria noted above, independent of sorption time. For example, the effect of marking fluid on the surfaces is determined to see if the fluids caused softening and gouging of the surface with resultant clogging of the pen tip. A gel swell test as is known in the art may also be used to determine which materials are soluble in the selected liquids, i.e. won't retain their integrity, and which swell within an acceptable range demonstrating their permeability to, and integrity in the presence of, the liquids. The results of these screening tests may indicate a number of polymers have acceptable surface properties.

The sorption times of these materials is then measured by the following test. A polyester sheet (or other liquid-impermeable substrate) is coated with a single, dried layer (e.g. 50-100 micrometer wet thickness) of the polymer to be tested and is inserted into the plotter. The plotter is then programmed to make a variety of marks on the sheet including about 30 meters of straight lines, and a series of S's and X's at timed intervals. The plotter then uses a solid teflon stylus to cross the tips of the letters, again at timed intervals. By noting which letters are smeared by the teflon tip and which are not, the time required to sorb the liquid into the surface or "dry" (i.e. not smear) can be reproducibly determined. The sorption times, as determined by the above plotter test, for a number of polymeric materials having suitable surface characteristics are shown in Table 1 hereinafter.

As a practical matter, the performance of the sorption time test noted above will also be useful to help identify materials having certain preferred surface characteristics. For example, polymer F in Table 1 appears to have acceptable surface characteristics while the remaining polymers are deficient in some respects.

A second phase of the selection procedure comprises determining the sorption times for a number of marking fluid-sorptive materials. These materials can be initially selected by reference to a number of criteria as are taught in known texts on liquid sorption. For example, solubility parameters for many materials are known and will give a preliminary indication of which polymers are most likely to be useful with given liquids. The gel swell test noted hereinbefore may also be useful. It is noted that some of these materials will be the same as the surface layer materials selected above. The sorption times of these underlayer candidates are then determined using the sorption time test described above. Sorption times for various underlayer candidates are also shown in Table 1.

TABLE 1

| | | Sorption Time | Comments |
|---|---|---|---|
| A | Plain Polyester Sheet | 15 min | Ink beads |
| B | Commercial Transparency Film (thin, crosslinked gelatin coating) | 20 min | Water sensitive |
| C | Methyl Methacrylate/ethacrylate Copolymer ("Lucite" 2042, DuPont) | 20 min | Ink beads |
| D | Styrene/acrylonitrile ("Tyril" 880, Dow Chemical) | 20 min | Ink beads |
| E | Methyl Methacrylate ("Lucite" 2041 DuPont) | 16 min | Ink beads |
| F | Cellulose Acetate Butyrate (CAB 171-15S, Eastman Chemicals) | 10 min | OK |
| G | Polyvinyl Acetate ("Vinac" B-100, Air Reduction Chemicals) | 10 min | Pen clogged |
| H | Gelatin (photograde) | 4.5 min | Water |

TABLE 1-continued

| | | Sorption Time | Comments |
|---|---|---|---|
| I | Polyvinylpyrrolidone - 360,000 MW (K-90, General Aniline & Film) | 3.5 min | sensitive Pen clogged |
| J | Polyvinylpyrrolidone - 40,000 MW (K-30 General Aniline & Film) | 2 min | Pen clogged |
| K | Poly(Methyl Vinyl Ether/ Mono Methyl Maleate) esterified ("Gantrez" AN-149, General Aniline & Film) | <10 sec | |
| L | Polyvinyl Alcohol ("Gelvatol" 20-90, Monsanto) | 1.5 min | |
| M | Polyvinylpyrrolidone (K-30) | 2-3 min | |
| N | Polyvinylpyrrolidone (K-90) | 3-3.5 min | |
| O | Gelatin (photograde) | 4-5 min | |
| P | Polyvinyl Acetate ("Vinac" B-100) | 10 min | |

*All layers 75 micrometers wet film thickness coated at 10% solids in various solvents.
**Sorption time determined using marking pen fill comprising, by weight, 63% methyl cellosolve, 18% n-propanol, 10% methanol, 3% trichloroethylene, 3% formaldehyde, 1% acetone.

Having tested all of the candidate materials individually, composite media are prepared by coating a layer (e.g., 75 micrometers wet thickness—10% solids) of the underlayer candidate on the polyester oven drying the layer and then overcoating with a surface layer candidate (e.g. 50 micrometers wet thickness—10% solids) followed by oven drying. The same sorption time test is then performed on each composite medium. The results for a number of composite media are shown in Table 2.

TABLE 2
Sorption Times, Composite Media On Polyester Sheets

| Surface Layer Material | M = minutes S = seconds | | | | | |
|---|---|---|---|---|---|---|
| A | — | — | — | — | — | — |
| B | — | — | — | — | — | — |
| C | 20M | 20M | 20M | 20M | 20M | — |
| D | 20M | 20M | 20M | 20M | 20M | — |
| E | 16M | 16M | 16M | 16M | 16M | — |
| F | 2M | 2M | — | 2.5M | 3M | 6M |
| G | 2M | 2M | — | 2.5M | 7M | — |
| H | 10S | 10S | 10S | 10S | — | — |
| I | 20S | 2M | 2.5M | — | — | — |
| J | 10S | 2.5M | — | — | — | — |
| | K | L | M | N | O | P |
| | | | Underlayer Material | | | |

*Top layers coated at 50 micrometers wet thickness, underlayers 75 micrometers wet thickness, at 10% solids.
**Sorption times determined using same pen liquid as in Table 1.

As can be seen from the data presented in Tables 1 and 2, a polymeric material having excellent surface characteristics may have an unacceptably long sorption time. For example, cellulose acetate butyrate has a dry time of about ten minutes. Other liquid-sorbent materials have extremely short sorption times, such as poly(methylvinyl ether/mono methyl maleate) which has a sorption time of less than ten seconds. A composite media comprising cellulose acetate butyrate as the surface layer and poly(methyl vinyl ether/mono methyl maleate) as the underlayer has a sorption time of about 2 minutes, an acceptable time for the intended application. Other combinations can be provided having longer sorption times which may be acceptable for some applications. Combinations having shorter sorption times can also be prepared.

Table 2 emphasizes one other aspect of the invention. It should be noted that surface layer candidates C-E showed no decrease in apparent dry time when combined with poly(methyl vinyl ether/mono methyl maleate) as the underlayer. While not clearly understood, it is believed that materials C-E are relatively impermeable to the liquids employed and the use of an underlayer is not effective to decrease their effective dry time. Accordingly, these combinations of media and liquids are not within the scope of the present invention since the surface layer materials are not liquid-sorbent or liquid-permeable with respect to the organic liquids employed. However, these polymers in different combinations and with other liquids to which they are permeable may be operative. As noted previously herein a gel swell test may also be useful to identify candidate materials which would be useful in the composite media of the present invention. A recognized test is described in *Principles of Polymer Chemistry* by Paul J. Flory, Cornell University Press (1953). This test involves submerging weighed samples in the selected liquid for a period of time and weighing the samples following exposure to the liquid (gel sample). The percent gel swell is calculated by the formula $$\% \text{ gel swell} = \left[ \frac{\text{gel sample weight}}{\text{initial sample weight}} - 1 \right] \times 100$$

The test results using a typical pen solvent comprising, by weight, 63% methyl cellosolve, 18% n-propanol, 10% methanol, 3% trichloroethylene, 3% formaldehyde and 1% acetone, were as follows:

| | |
|---|---|
| poly(methyl vinyl ether/mono methyl maleate) | Dissolved |
| polyvinylpyrrolidone | Dissolved |
| polyvinyl acetate | Dissolved |
| cellulose acetate butyrate | Swelled 300-350% |
| gelatin | Swelled 475-525% |

These results indicate cellulose acetate butyrate and gelatin may be useful as surface materials with this liquid, but that the other materials would be adversely affected by the liquid.

Copending application Ser. No. 28,347 filed Apr. 9, 1979, describes and claims other embodiments of the present invention and is hereby incorporated by reference. Specifically this application describes the preparation of composite media comprising water-soluble, rubbery polymers which are alkaline in aqueous solution as the underlayer and a polymer containing the repeating units

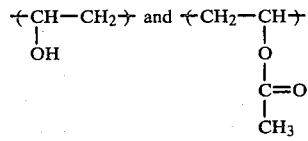

and having an average molecular weight of at least about 50,000 as the surface layer. Exemplary of the underlayer materials are the reaction products of a water-soluble secondary monoamine and an epoxidized water-insoluble, neutral rubbery polymer selected from Cis-1, 4-polybutadiene, butadiene:styrene copolymer, butadiene:acrylonitrile copolymer and Cis-1, 4-polyisoprene. These materials are further described in U.S. Pat. No. 3,661,874. Exemplary surface materials comprise polyvinyl alcohol polymers prepared by the reaction of polyvinyl acetate and methanol in the presence of sulfuric acid. Techniques for making sheets comprising composite liquid-sorbent media are described in the copending application and an example (Example 13) describes the preparation of a specific product.

It should also be noted that while this specification speaks in terms of "first" and "second" materials and "surface" and "underlayer" materials, these materials can be of the same general chemical type although their liquid sorption properties are different. For example, a polymeric material having a relatively high crosslink density may be useful as a surface layer material and a less crosslinked version also useful as the underlayer in the same composite medium.

While the invention has been illustrated with respect to a particular embodiment, the concepts disclosed are applicable to a wide variety of applications. The procedure for selecting the candidate materials is the same. That is, determine the liquid to be employed and the surface characteristics required of the medium. Pick materials having the required surface characteristics independent of sorption time and measure the sorption time of the acceptable surface materials. Then test materials having acceptable liquid sorptivity for the given liquid using an appropriate sorption dry time test. Finally, prepare composite media comprising each surface material of choice with the underlayer candidate having the fastest and slowest sorption time to determine the range of sorption times which can be achieved and select the combination having the desired sorption time. The substrates which can be used in the present invention are materials which can support the liquid-sorbent composite media. Generally solid, continuous, sheetlike substrates are employed. Typical materials are polymeric sheets although as can be appreciated, a wide variety of organic and inorganic materials can be employed. For example, paper sheets may be employed. A particularly preferred class of substrates for use in the present invention are transparent, polymeric sheets (generally about 100 micrometers thick) such as polyester, e.g., poly(ethylene-terephthalate), and acetate, e.g., triacetate film base.

The liquid-receptive media of the present invention can be prepared and applied to a variety of substrates by conventional solvent coating techniques. Generally, a "two-trip" coating process is employed wherein the liquid-sorptive polymer is dissolved in a suitable solvent and coated onto a substrate. The coating is dried and the surface layer applied from a solvent solution in a second coating trip and the second coating dried. Generally, the coating thickness will be on the order of a few micrometers for each layer as previously described. The thickness will be dependent on the type of substrate employed, cost, the need for transparency, drying conditions available, etc.

Depending on the substrate employed, it may be desirable to employ a primer between the substrate and the first coating layer, i.e. the liquid-sorptive underlayer. When coating polyester substrates, it has been found desirable to employ a primer, such as polyvinylidene chloride, to ensure good adhesion of the liquid-sorbent media to the substrate.

It may also be beneficial to employ a primer between the surface layer and the underlayer materials where these materials do not bond sufficiently to one another. The material chosen for the primer should not interfere with the liquid permeability of the topcoat or the sorbtivity of the underlayer material. In some instances the primer may itself be permeable or may be a material having good liquid-sorbent properties though not being suitable as an underlayer material, for example, due to cost, flexibility, etc. The primary layer between the surface layer and the underlayer materials will generally be very thin relative to the thickness of the adjacent layers. Gelatin is illustrative of a potential primer material for certain applications.

The present invention may be further illustrated by reference to the following examples.

EXAMPLE 1

A transparent polymeric imaging sheet according to the present invention was prepared as follows:

180 grams of methanol was heated to near boiling (55°-64° C.) and 20 grams of poly(methylvinylether/maleic anhydride) was slowly added with continuous stirring. After 3 to 4 hours the milky, opaque solution turned clear. The clear solution was coated onto a 100 micrometer thick polyester sheet (which was primed with polyvinylidene chloride) to a wet thickness of about 75 micrometers on a knife coater. The coated sheet was dried in an 80° C. oven for about 2-3 minutes to remove the solvent.

A second solution comprising cellulose acetate/butyrate at 10% concentration in methylethylketone was coated on top of the poly(methylvinylether/monomethylmaleate) layer at a wet thickness of 50 micrometers on a knife coater and the sheet dried in an 80° C. oven for about 2-3 minutes to remove solvent.

Sheets prepared as above provided superior ink receptive substrates when used in a mechanical plotting device. The sheets were dry to light wiping in about two minutes when imaged in the plotter and exhibited other satisfactory handling characteristics, e.g., no fingerprinting.

EXAMPLE 2

In order to show the operation of the present invention with a nonpolar liquid a liquid-sorbent sheet was prepared by coating polyisobutylene ("Vistanex" L140, Exxon) at 8% by weight in heptane onto a polyester sheet at a wet film thickness of 125 micrometers on a knife coater. The coated sheet was dried in an oven at 80° C. for 2-3 minutes to remove solvent.

A second solution comprising a soluble polyester ("Vitel" P.E. 307, Goodyear) at 10% by weight in a blend of 60% methylethylketone, 40% toluene was coated on top of the dried polyisobutylene layer at a wet film thickness of 50 micrometers on a knife coater. The coated sheet was dried at 80° C. for 2-3 minutes to remove the solvent.

Sheets prepared as above were imaged in a plain paper copier (Savin 760) using a liquid toner system. The solvent system for the toner was a deodorized kerosene ("IsoPar" G, Exxon). Sheets coated with the polyisobutylene alone are very receptive to and rapidly sorb the solvent. However, the surface characteristics of such sheets do not allow them to feed through the copier machine. Sheets coated with the soluble polyester alone fed through the machine properly, but required over 1 minute to become dry to the touch. The sheets having the composite liquid-sorbent imaging surface fed through the machine and dried to the touch in about 10 seconds.

What is claimed is:

1. A composite medium for sorbing liquids comprising, in combination, a liquid-sorbent underlayer and, overlying said underlayer, a liquid-permeable surface layer capable of retaining its integrity in contact with said liquid and liquid applying means, the liquid sorptivity of said underlayer being greater than the liquid sorptivity of said surface layer whereby the composite medium has a sorption time less than the sorption time of said surface layer.

2. A composite medium according to claim 1 wherein a liquid permeable primer layer is interposed between said surface layer and said underlayer.

3. An article comprising a substrate having adhered to at least a portion of one surface thereof the composite, liquid-sorbent medium of claim 2.

4. An article comprising a substrate having adhered to at least a portion of one surface thereof the composite, liquid-sorbent medium of claim 1.

5. An article according to claim 4 wherein said surface layer is less than about 10 micrometers thick.

6. An article according to claim 4 wherein said liquid comprises a polar liquid.

7. An article according to claim 4 wherein said substrate is a sheet and wherein said composite, liquid-sorbent medium is adhered to at least a portion of at least one major surface of said sheet.

8. An article according to claim 7 wherein said sheet is a paper sheet.

9. A sheet according to claim 7 wherein said liquid-permeable surface layer is a polymeric resin selected from the group consisting of cellulose acetate/butyrate, gelatin, polyvinyl alcohol, polyvinyl acetate and polyvinylpyrrolidone.

10. A sheet according to claim 7 wherein said liquid-sorbent underlayer is a polymeric resin selected from the group consisting of poly(methyl vinyl ether/mono methyl maleate), gelatin, and polyvinyl pyrrolidone.

11. An article according to claim 7 wherein said sheet is a polymeric sheet.

12. An article according to claim 11 wherein said polymeric sheet is transparent.

13. A sheet according to claim 12 wherein said transparent, polymeric sheet is a polyester sheet.

14. A substantially transparent, ink-receptive sheet comprising a transparent polyester sheet and, adhered to at least a portion of at least one major surface thereof, a composite, organic liquid-sorbent medium comprising a layer of poly(methyl vinyl ether/monomethyl maleate) adhered to said sheet and, in overlying, intimate contact therewith, a thin surface layer comprising cellulose acetate butyrate polymer.

15. A sheet according to claim 14 wherein a primer is interposed between said first layer and said polyester sheet.

16. An imaging system comprising an organic imaging liquid, a substrate having an imaging surface, and an imaging liquid application means, wherein the improvement comprises a composite imaging surface comprising, in combination, a liquid-sorbent underlayer and, overlying said underlayer, a liquid-permeable surface layer capable of retaining its integrity in contact with said liquid and said application means, the liquid sorptivity of said underlayer being greater than the liquid-sorptivity of said surface layer, whereby the composite imaging surface has a sorption time less than the sorption time of said surface layer.

* * * * *